United States Patent [19]
Stegemann et al.

[11] Patent Number: 6,052,901
[45] Date of Patent: Apr. 25, 2000

[54] PROCESS FOR PRODUCTION OF LIGHTWEIGHT SHEET-STEEL WHEEL FOR VEHICLES

[75] Inventors: Thomas Stegemann, Dinslaken; Adam Frings, Müheim., both of Germany

[73] Assignee: Thyssen Stahl AG, Duisburg, Germany

[21] Appl. No.: 09/155,435

[22] PCT Filed: Mar. 10, 1997

[86] PCT No.: PCT/EP97/01194

§ 371 Date: Sep. 25, 1998

§ 102(e) Date: Sep. 25, 1998

[87] PCT Pub. No.: WO97/35783

PCT Pub. Date: Oct. 2, 1997

[30] Foreign Application Priority Data

Mar. 27, 1996 [DE] Germany ................ 196 12 021

[51] Int. Cl.[7] .................................. B21K 1/32
[52] U.S. Cl. .................. 29/894.324; 29/894.325; 301/63.1
[58] Field of Search .............. 29/894.322, 894.323, 29/894.324, 894.325; 301/63.1

[56] References Cited

U.S. PATENT DOCUMENTS

| | | | |
|---|---|---|---|
| 1,413,051 | 4/1922 | Michelin | 29/894.325 |
| 1,623,883 | 4/1927 | Michelin | 29/894.325 |
| 5,446,962 | 9/1995 | Matossian et al. | 29/894.324 |

FOREIGN PATENT DOCUMENTS

| | | |
|---|---|---|
| 0054931 | 6/1982 | European Pat. Off. . |
| 0570340 | 11/1993 | European Pat. Off. . |
| 3144090 | 5/1983 | Germany . |
| 3239675 | 5/1984 | Germany . |
| 3410308 | 10/1985 | Germany . |
| 4014480 | 11/1990 | Germany . |
| 296 05 728 | 10/1996 | Germany . |

OTHER PUBLICATIONS

Kapadia, M.A. and Eifert, R.T., Evolution of the New Ford Arostar Impact Extruded Aluminum Wheel, SAE Tech. Paper Series 841694 Truck and Meeting and Exposition, Dearborn, Michigan, Dec. 3–6, 1984.

*Primary Examiner*—P. W. Echols
*Attorney, Agent, or Firm*—Proskauer Rose LLP

[57] ABSTRACT

The invention relates to a light construction wheel of steel sheet which is produced by the cold working of a flat, one-piece circular steel sheet disc formed by the welding together of a first circular disc (1) and a second annular disc (3). In the light construction wheel the first circular disc (1) for the wheel disc/dish (1\*) and the second annular disc (3) for the wheel rim (3\*) are made from different uncoated or coated sheets which differ in thickness and/or strength of material in accordance with the local given strength requirements of the light construction wheel.

5 Claims, 2 Drawing Sheets

PROCESS FOR PRODUCTION OF LIGHTWEIGHT SHEET-STEEL WHEEL FOR VEHICLES

BACKGROUND OF THE INVENTION

In vehicle building, great efforts have been made for decades to reduce the weight of vehicles. Great importance is attached in this respect above all to moving masses, more particularly the wheels. For a long time purchasers of motor vehicles have already had the option of choosing between a light aluminium wheel and a heavy steel wheel. Despite the advantage of an aluminium wheel in view of the improved driving behavior of the motor vehicle and the cheaper operating costs of a vehicle equipped with light metal wheels, predominantly steel wheels are purchased, as they are substantially more reasonable in price.

The majority of steel wheels used in practice are welded together from a ready-shaped rim and a ready-shaped wheel disc/dish. In such a wheel the wheel disc/dish can be made from a material of greater thickness than that of the wheel rim, however, the cost of manufacturing such a wheel is high due to the separate deformation of the wheel disc/dish and the wheel rim and the subsequent welding together of the two parts.

Light construction aluminium and steel wheels are also known which are produced from a flat circular disc by shaping and splitting (DE 34 10 308 A1, DE 32 39 675 C2) These vehicle wheels are made by the outer edge of the circular discs being split radially into two rings, which are opened up, the rim being formed therefrom. Such a wheel is therefore given its light construction by the most heavily loaded wheel disc/dish being made from a thicker material and the rim from a thinner material. Even though such a wheel is made from one piece, its cost is high, due to the opening up of the outer edge of the circular disc.

It is an object of the invention to provide a light construction wheel for vehicles whose production is as simple as possible.

This problem is solved according to the invention by a light construction wheel which is made by cold working from a circular steel sheet disc. The light construction wheel has a wheel disc/dish and a wheel rim, more particularly for tires, the wheel disc/dish being formed from a first flat circular disc and the wheel rim from a second flat circular disc welded thereto. The first and second circular discs are made from different sheets which differ in thickness and/or strength of material in accordance with the locally given strength requirements. The sheets can be uncoated or coated, for example given a surface finish.

Furthermore, an aluminium rim made from sheet metal is known for vehicles having pneumatic or rubber tires (EP 0 054 931 A2). The rim is produced by a start being made from a flat circular disc which in a first step is deformed pot-shaped. This already gives the lower zone of the wall a shape from which the two rim horns are formed after parting. After separation, the wall of the other side of the end is welded on and co-operates with the radially outer part of the end and the lower portion of the wall to form the rim dish. Such a process of production is expensive, due to the necessity of separating a portion of the shaped circular disc and the welding-on required.

Lastly, a disc wheel in the form of a welded sheet metal construction is known for a vehicle having pneumatic tires (DE 31 44 090), wherein the wheel disc thicker in material merges via its thinner edge, forming a rim horn, into the rim bed of thinner material. This prior art does not disclose from what sheet metal blanks a start is made for the wheel disc and the wheel rim.

SUMMARY OF THE INVENTION

It is an object of the invention to provide a simple production process for a light construction vehicle wheel. This problem is solved by the features of the invention.

In the light construction wheel according to the invention the differentially heavily stressed parts, namely the wheel disc/dish and the wheel rim are differentially dimensioned in accordance with their stressing during operation. Such dimensioning can be performed in a problem-free manner, since the circular sheet steel disc is welded together from different sheets. The expensive opening up of an outer edge zone is also eliminated, since previously suitably dimensioned more particularly thinner material can be used for the rim. Production is also simple, since a start is made from a single piece of preliminary material, namely the steel sheet disc. Cold working can be performed in the established manner by deep drawing, pressing or roller profiling. Problems caused by the weld during shaping or during operation can be counteracted by the fact that the weld is disposed in a zone only slightly deformed in comparison with a heavily deformed zone. Such a zone is situated, for example, immediately alongside the horn of the wheel rim adjacent the wheel disc. Preferably the weld is situated on the wheel rim side of the horn.

Another step for dealing with problems caused by the weld is that the weld is a laser weld, an electron beam weld or a weld produced simultaneously by laser beam and plasma beam. Such a weld is characterized in that it is very narrow and its strength behavior can hardly be altered by the welding in the adjacent zone. For this reason beam-welded shaped parts are particularly suitable for cold working.

To avoid any sudden transition at the weld from the thinner to the thicker material, the thicker zone adjoining the weld should taper to the lesser thickness of material.

An embodiment of the invention will now be explained in greater detail with reference to the diagrammatic drawings, which show:

DETAILED DESCRIPTION OF THE INVENTION

Figure 1:
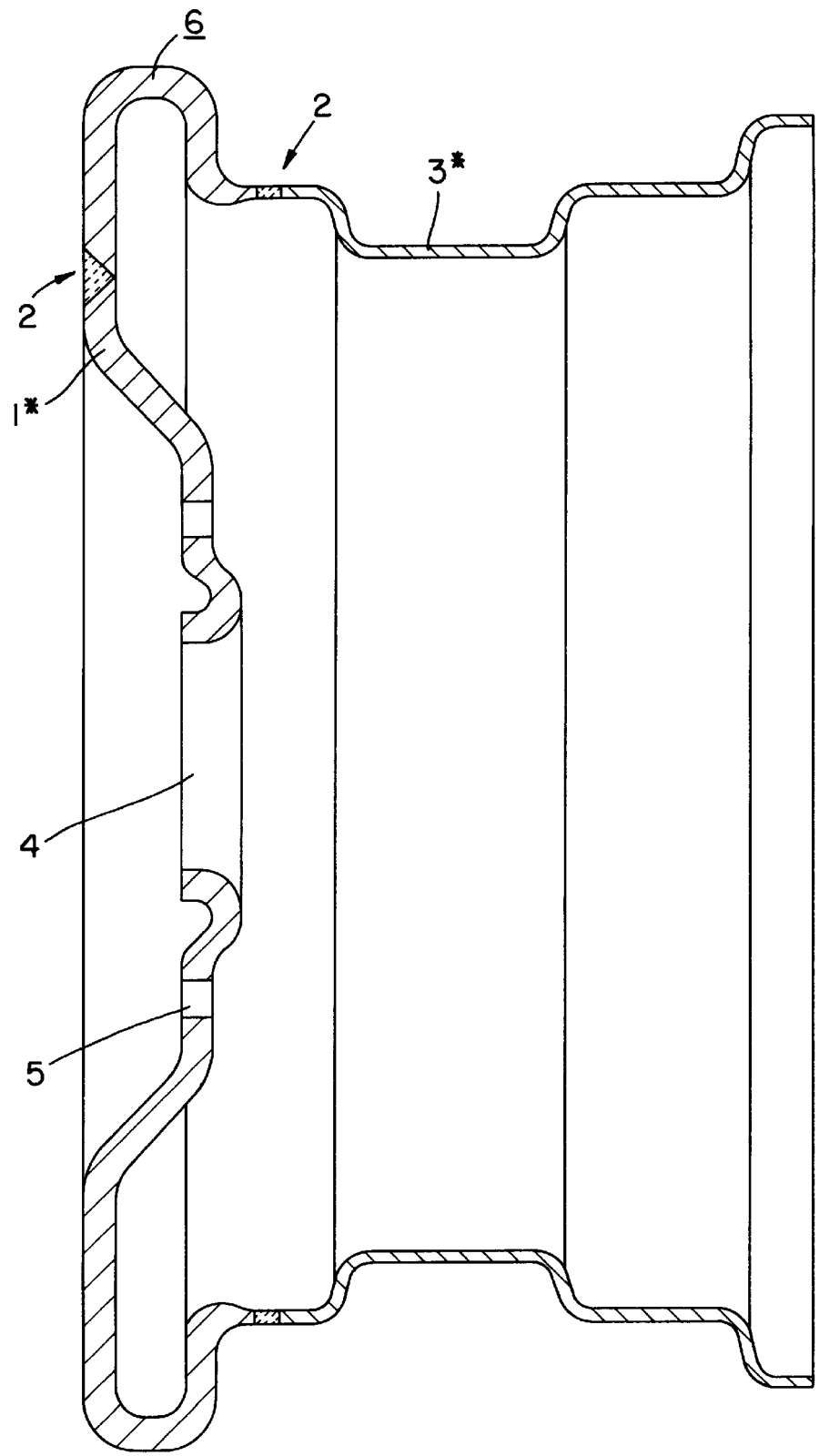
FIG. 1 is a vehicle wheel in cross-section.
Figure 2A:
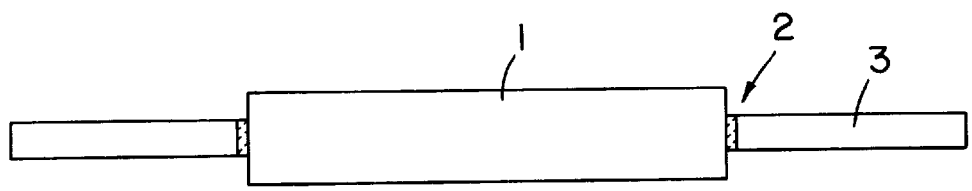
FIG. 2 a, b is a cross-section of two alternatives for a circular steel sheet disc for producing a light construction wheel as shown in FIG. 1.
Figure 2B:
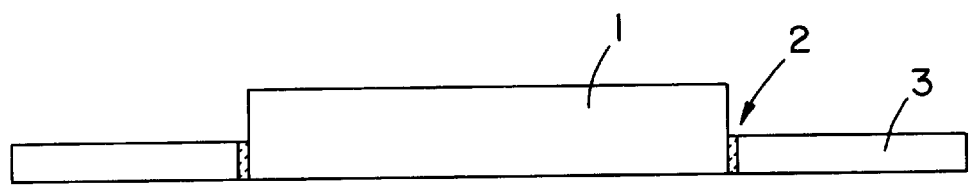

Referring to FIG. 1, in the production of a light construction wheel a start is made from a flat steel sheet disc (FIGS. 2 a, b) consisting of a first central flat annular disc 1 and a second flat annular disc 3 welded to its edge by means of a beam weld 2. Both the first circular disc 1 and the second circular disc 3 are made from steel sheet. The two discs can be so aligned in relation to one another that either the central lines of their thickness (FIG. 2a) or their surfaces (FIG. 2b) lie in a horizontal plane.

The first circular disc 1 has a greater thickness of material than the second annular disc 3. However, the disc 1 can have the same thickness of material as the disc 3. However, in that case the disc 1 is made from a material of greater strength than that of the disc 3. The discs 1 and 3 can be dimensioned as regards the thickness and strength of their materials in accordance with the local stressings on the light construction wheel. Combinations of all kinds are conceivable.

Figure 3:
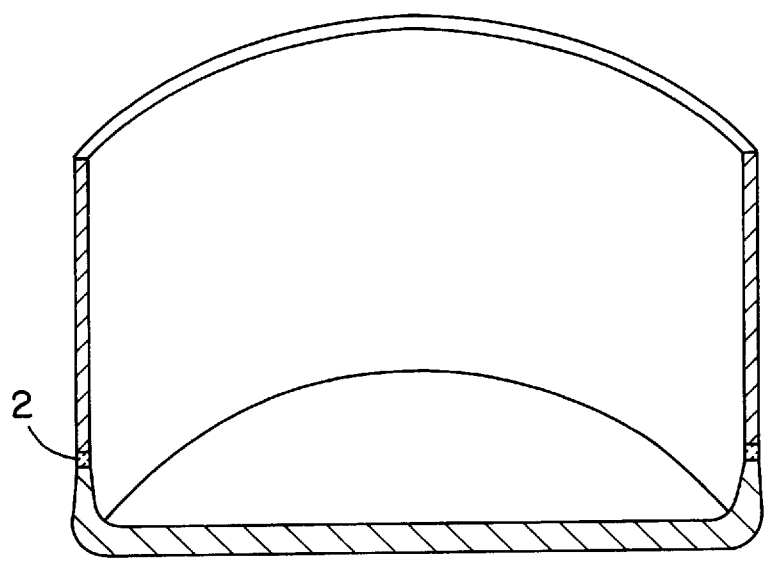
FIG. 3 is a semi-section in perspective of a pot, an intermediate product in the production of the wheel as shown in FIG. 1, produced by cold working such as, for example, deep drawing or pressing from the steel sheet disc shown in FIGS. 2 a, b.

In a first deformation stage the flat steel sheet disc 1, 2, 3 is formed, more particularly by deep drawing into a pot as shown in FIG. 3. Even during this shaping the transition in material at the weld 2 can be adapted by tapering that edge zone of the thickness of the ring 3 which adjoins the weld 2. However, it is also conceivable for the tapering edge to be produced prior to flat welding-on. In further deformation stages, more particularly by roller profiling, the pot-shaped member shown in FIG. 3 is then brought into the final shape of the wheel, as shown by way of example in FIG. 1. The major part of the wheel rim 3*  is formed from the ring 3, while the total wheel disc/dish 1* and also a rim horn 6 are formed from the first circular disc 1. Prior to these further shaping steps by roller profiling or pressing, during said steps or thereafter, a central recess 4 for the head of a wheel axle is made in the wheel disc/dish 1* and a ring of holes 5 for wheel bolts.

In order to give a positive visual impression, the wheel disc/dish can be so designed as to allow the elimination of the nowadays still usual plastics coverings for the wheel disc/dish, which represent a considerable proportion of the costs of such vehicle wheels.

Viewed from the rim horn 6, the weld 2 can be disposed on the side of the wheel rim 3* or, as indicated, on the side of the wheel dish 1*. If it is disposed on the side of the wheel rim 3*, it is invisible from outside when the tire is put on, so that the vehicle wheel makes a particularly advantageous visual impression. If, in contrast, the weld 2 is situated on the side of the wheel dish 1*, the advantage is that the proportion of thin rim material on the entire wheel is maximized, so that the saving in weight is maximized also. Of course, there are limits of mechanical strength to any selection of the weld position to this end, so that a compromise must be found as regards the visual effect of the wheel and as large a saving in weight as possible in relation to the position of the weld 2.

Both symmetrical and also asymmetrical rim profiles can be produced by this process.

The use of steel sheet qualities with a surface finish enables the wheel to have satisfactory resistance to corrosion and an advantageous visual appearance.

What is claimed is:

1. A process for the production of a lightweight wheel comprising the steps of:

(a) welding a first flat annular disc having an outer circular edge to a second flat annular disc having an inner circular edge, the discs being welded to each other at the outer and inner circular edges to form a start, and being formed from different materials such that the first flat annular disc has a strength that is greater than the second annular disc; and (b) cold working the start to form the wheel having a wheel disc, a wheel rim and a rim horn therebetween, the wheel disc being formed from the first flat annular disc and the wheel rim from the second flat annular disc.

2. The process according to claim 1 wherein the flat annular discs are sized so that the weld is positioned between the rim horn and the wheel disc.

3. The process according to claim 1 wherein the flat annular discs are sized so that the weld is positioned between the rim horn and the wheel rim.

4. The process according to claim 1 wherein the welding step comprises a beam welding process selected from the group consisting of electron beam welding and laser beam welding.

5. The process according to claim 1 wherein the first and second flat annular discs have different thicknesses, the first flat annular disc having an outer periphery adjacent to the first flat annular disc outer edge, the first flat annular disc having a thickness that is greater than the thickness of the second flat annular disc and the first flat annular disk outer periphery having a thickness that is tapered to that of the second flat annular disc at the first flat annular disc outer edge.

* * * * *